(12) United States Patent
Schulze et al.

(10) Patent No.: US 6,931,947 B2
(45) Date of Patent: Aug. 23, 2005

(54) MEASUREMENT DEVICE AND SEATING ARRANGEMENT

(75) Inventors: Werner Schulze, Goettingen (DE); Herbert Engelhardt, Moringen (DE); Lothar Golla, Ahrensburg (DE)

(73) Assignee: Sartorius Aktiengesellschaft, Goettingen (DE)

( * ) Notice: Subject to any disclaimer, the term of this patent is extended or adjusted under 35 U.S.C. 154(b) by 0 days.

(21) Appl. No.: 10/325,867

(22) Filed: Dec. 23, 2002

(65) Prior Publication Data

US 2003/0136202 A1 Jul. 24, 2003

(30) Foreign Application Priority Data

Dec. 21, 2001 (DE) .......................... 101 63 308

(51) Int. Cl.[7] .............. G01L 1/00; G01L 5/00
(52) U.S. Cl. .............. 73/862.381; 73/862.391
(58) Field of Search .......... 73/826, 818, 862.045, 73/862.391, 862.381

(56) References Cited

U.S. PATENT DOCUMENTS

| | | | |
|---|---|---|---|
| 5,801,339 A | * | 9/1998 | Boult .......................... 177/261 |
| 5,804,339 A | * | 9/1998 | Kim .............................. 430/5 |
| 6,002,090 A | | 12/1999 | Johnson et al. |
| 6,039,344 A | * | 3/2000 | Mehney et al. ................ 73/781 |
| 6,069,325 A | | 5/2000 | Aoki |
| 6,349,602 B1 | * | 2/2002 | Hamada et al. ................ 73/782 |

FOREIGN PATENT DOCUMENTS

| | | |
|---|---|---|
| EP | 0 566 182 A1 | 10/1993 |
| EP | 0 670 480 B1 | 9/1995 |
| WO | WO 01/18507 A1 | 3/2001 |

* cited by examiner

*Primary Examiner*—Max Noori
*Assistant Examiner*—Lilybett Martir
(74) *Attorney, Agent, or Firm*—Sughrue Mion, PLLC (57) ABSTRACT

A measurement device (10; 110; 210) and associated seating arrangement, in particular for measuring a weight acting on a vehicle seat, that includes: a force transmission element (12; 112; 212), which is connectable to a first unit, preferably a vehicle seat, and a measurement assembly (14; 50; 114; 214), which is rigidly connectable to a second unit (80), preferably a vehicle body part. The force transmission element (12; 112; 212) is pivotable about at least one axis around the measurement assembly (14; 50; 114; 214).

28 Claims, 9 Drawing Sheets

MEASUREMENT DEVICE AND SEATING ARRANGEMENT

The following disclosure is based on German Patent Application No. 101 63 308.4, filed on Dec. 21, 2001, which is incorporated into this application by reference.

FIELD OF AND BACKGROUND OF THE INVENTION

The present invention relates to a measurement device, particularly for measuring a weight acting on a vehicle seat, and to an associated seating arrangement.

Measurement devices are generally used for determining the weight acting on a vehicle seat. This is particularly of interest in the development of air bag systems. In this way, more precise triggering of the airbag may be achieved. Thus, for example, it may be differentiated whether a very heavy person or a child is located on the vehicle seat. Furthermore, it may be established whether the person sits centrally or off-center on the seat. The air bags are then correspondingly triggered if necessary.

Such measurement devices are known, for example, from International Publication WO 01/18507 A1, as having a force transmission element and a measurement assembly. The force transmission element is attached to a vehicle seat and is rigidly connected to the measurement assembly. The measurement assembly is connected to a seat rail in the floor of the vehicle or another suitable vehicle body part. Such measurement devices from the related art have the disadvantage, however, that not only the vertical weight, which is to be measured, is conducted into the measurement device, but also forces that act in other directions and that therefore distort the measurement result.

A measurement device is described in European Patent Application 0 670 480 A1, in which the pressure force to be measured is supplied to the measurement cell via a strut. In this case, the strut may perform a slight rotational and bending movement.

European Patent Application 0 566 182 A1 discloses a device for attaching a weighing element changeably. The device includes a body having a convex support surface and a body having a support surface with an offset. The two bodies are movably coupled via their support surfaces.

OBJECTS OF THE INVENTION

It is therefore an object of the present invention to provide a measurement device and a seating arrangement which allow precise and reliable measurement of the force conducted into the measurement device.

SUMMARY OF THE INVENTION

This and other objects are achieved, according to one formulation of the present invention, by a measurement device, particularly for measuring a force acting on a vehicle seat, including: (a) a force transmission element, such as a rocker, which is connectable to a first unit, preferably a vehicle seat, and (b) a measurement assembly, such as a force absorber, which is preferably rigidly connected to a second unit, preferably a vehicle body part. The force transmission element is pivotable about at least one axis around the measurement assembly and is designed in such a way that at least one of tensile forces and pressure forces is transmitted from the first unit to the measurement assembly.

Because the force transmission element is pivotable about at least one axis around the measurement assembly, only the perpendicular force acting on the measurement device is conducted into the measurement assembly. In particular, only the weight directed vertically downward, which acts on the measurement device, is absorbed by the measurement assembly. Forces which act transversely or diagonally to the measurement devices are not conducted into the measurement assembly due to the pivoting of the force transmission element around the measurement assembly. Therefore, an advantageous decoupling of the force acting on the measurement device and the torque acting on the measurement device may also be achieved. In this way, only the actual force acting on the measurement assembly may be measured, without this assembly being influenced through undesired torques. Furthermore, the measurement assembly is not stressed by torques, which leads to a longer service life of the measurement assembly.

Preferably, a region is provided in the force transmission element into which the measurement assembly may be inserted. As a consequence, the force transmission element essentially encloses the measurement assembly around its circumference. Through the form-fitting arrangement, a force to be measured is transmitted from the force transmission element into the measurement assembly.

The force transmission element preferably encloses the measurement assembly at least partially around its circumference.

The force transmission element and the measurement assembly preferably essentially form a ball joint, e.g. a ball and socket joint, the measurement assembly preferably having a region which it uses as a ball pivot, e.g. a complete ball, and the force transmission element preferably having a region which it uses as a ball socket.

By providing the measurement assembly and the force transition element as a ball joint arrangement, pivoting of the force transmission element in all tangential directions around the measurement assembly is possible. Therefore, it may be ensured even more reliably that undesired forces are not conducted into the measurement assembly.

The force transmission element preferably has, in at least some regions, essentially the shape of a hollow spherical zone, e.g. spherical cup and/or a hollow half sphere whose cap is cut off, and has an attachment element positioned on an equator region of the spherical zone region, which attaches the force transmission element to the first unit. Furthermore, the measurement assembly essentially has a spherical zone region, e.g. a spherical cup region, which has a radius that permits it to fit together with the inside of the spherical zone region of the force transmission element. The force acting on the measurement device is therefore conducted into the measurement assembly essentially via the equator region of the force transmission element. The region into which the force is transmitted essentially encloses the measurement assembly around its circumference. In this way, both tensile and pressure forces may be transmitted.

An attachment element is preferably implemented essentially around the circumference along the equator region of the spherical zone region of the force transmission element. The attachment element is advantageously configured integrally with the spherical zone region of the force transmission element. In a preferred embodiment, the attachment element essentially has the shape of a circular ring. However, it is also possible to implement the attachment element in a rod shape. Therefore, the measurement device may be attached to the first unit in a suitable way.

In a preferred embodiment, the measurement device also includes a union or positioning device, which is designed in such a way that it fixes the force transmission element in the radial direction in relation to the measurement assembly and allows at least limited rotation of the force transmission element in the tangential direction in relation to the measurement assembly. Furthermore, a projection is preferably provided on the pole of the spherical zone region, in order to receive the positioning device.

By providing the positioning device, the force transmission element is easily and reliably kept in its radial position in relation to the measurement assembly.

In a preferred embodiment, the internal shape of the positioning device is essentially a spherical shape in at least some regions, preferably having a flattened pole, and is designed to correspond essentially to the external shape of the ball joint. Therefore, the force transmission element is secured in position even better.

The projection of the spherical zone region of the measurement assembly is advantageously provided with a thread, preferably an external thread.

The positioning device advantageously also has a thread, preferably an internal thread, which fits together with the thread of the measurement assembly, and which fixes the positioning device, preferably non-rotatably, on at least one part of the measurement assembly. The positioning device is therefore screwed onto the projection of the measurement assembly and the force transmission element is kept securely in its position. The positioning device is also preferably elastically implemented in such a way that a pre-tension, originating from a part of the positioning device, acts on the ball joint.

In another preferred embodiment, the positioning device is fixed on the measurement assembly, so that it is rotatable in relation thereto, using a fixing device, preferably a nut. The positioning device is also preferably provided with a bearing region, from which a pre-tension acting on the ball joint originates. A pre-tension element and/or a pre-tension body, preferably a spring washer, is also preferably provided between the nut and the positioning device. The force of the pre-tension element advantageously acts in the direction of the axis, e.g. the axis of symmetry, of the positioning device. The pressure of the force transmission element on the measurement assembly may therefore be regulated in a simple way.

The attachment element preferably has at least one recess, and the positioning device preferably has at least one section projecting in a tangential direction, which is designed to engage in the recess of the attachment element and to allow rotation of the force transmission element in relation to the measurement assembly.

In another preferred embodiment, the force transmission element is rotatable and/or pivotable about two axes around the measurement assembly.

The force transmission element is preferably rotatable around a first axis that lies in the plane of the force transmission element, and around a second axis that essentially corresponds to the longitudinal axis of the measurement assembly.

In yet another preferred embodiment, a preferably circular hole is provided in the force transmission element, in which a rotating element and/or circular ring is rotatably mounted around the first axis. A circular opening is provided in the rotating element, in which the cylindrical measurement assembly is rotatable around the second axis.

In this way, because the measurement assembly is positioned in the circular hole of the force transmission element via the rotating element, i.e., the force transmission element essentially encloses the measurement assembly around its circumference, tensile and pressure forces are transmitted to the measurement assembly.

Furthermore, it is possible for the force transmission element and the measurement assembly to be implemented as a universal joint having mechanical axes.

A friction-reducing layer, preferably made of Teflon, is advantageously provided between the force transmission element and the measurement assembly in at least some regions. In this way, the friction during rotation and/or pivoting of the force transmission element around the measurement assembly can be reduced. A friction-reducing layer, preferably made of Teflon, is also preferably provided between the force transmission element and the positioning device in at least some regions. The friction-reducing layer is advantageously implemented as a coating or molded part.

The measurement assembly preferably has a polygonal, preferably rectangular, region that connects the measurement assembly to the second unit, so they are essentially locked. The measurement assembly also preferably has a threaded region that fixes the measurement assembly to the second unit. Therefore, the measurement device may be easily and securely attached to the second unit.

The measurement assembly advantageously includes a strain gauge.

In a further preferred embodiment, the measurement assembly includes a force conduction element, a force delivery element, and an expansion body that is provided between the force conduction element and the force delivery element. The expansion body is enclosed by at least one of the force conduction element or the force delivery element in a plane parallel to the effect of the weight. At least one strain gauge, which absorbs a shear force parallel to the weight, is positioned on the expansion body.

The present invention is additionally directed to a seating arrangement, which includes a measurement device e.g. according to a preferred embodiment of the present invention. The seating arrangement may particularly be a vehicle seat, an aircraft seat, a desk chair, or a wheelchair. Furthermore, the measurement device according to the present invention may also be used in a hospital bed.

BRIEF DESCRIPTION OF THE DRAWINGS

Further objects, features, and advantages of the present invention will become apparent from a more detailed description of preferred embodiments of the present invention with reference to the attached drawing, in which.

DETAILED DESCRIPTION OF THE PREFERRED EMBODIMENTS

Figure 1:
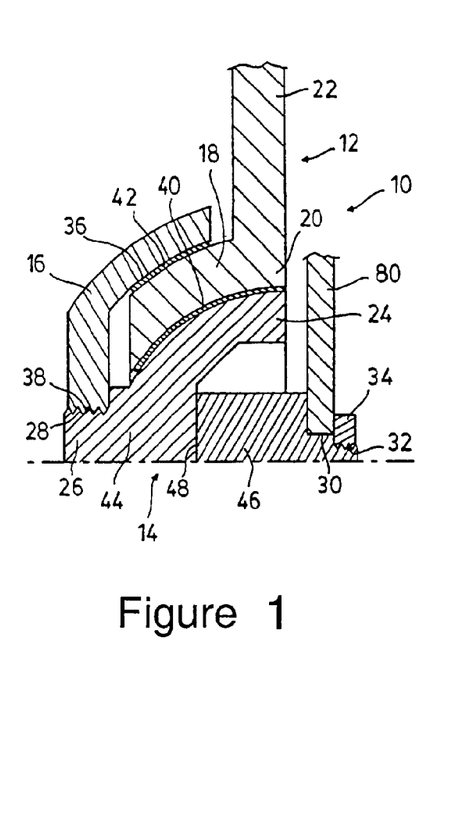
FIG. 1 shows a sectional view of a measurement device according to a first embodiment of the present invention.

FIG. 1 shows a sectional view of a measurement device 10 according to a first preferred embodiment of the present invention. Since essentially all parts of the measurement device according to the present invention are rotationally symmetric, only one half of the sectional view is shown.

The measurement device 10 according to the present invention includes a force transmission element 12, a measurement assembly/force absorber 14 and a swivel device/positioning device/union nut 16. The force transmission element 12 and the measurement assembly 14 together form a ball joint/ball and socket joint.

Figure 2:
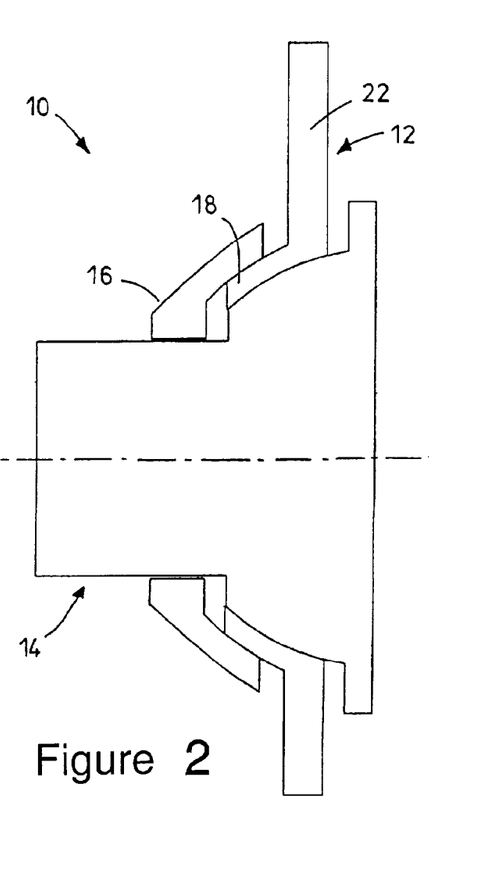
FIG. 2 shows a partial sectional view of a measurement device according to the first embodiment of the present invention.
Figure 3:
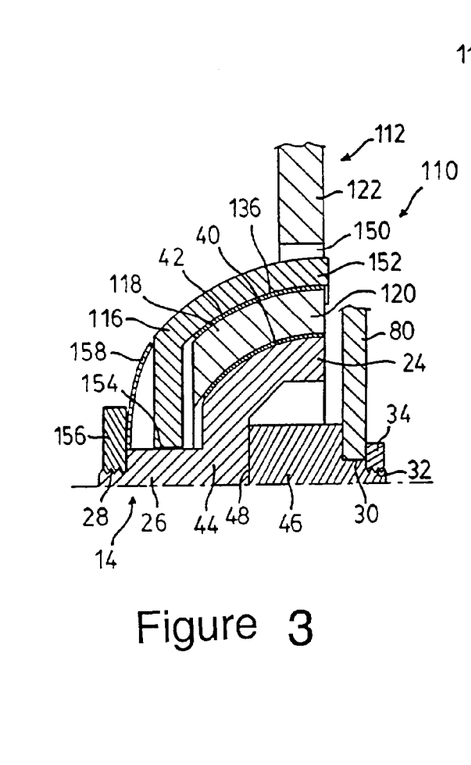
FIG. 3 shows a sectional view of a measurement device according to a second embodiment of the present invention.
Figure 4:
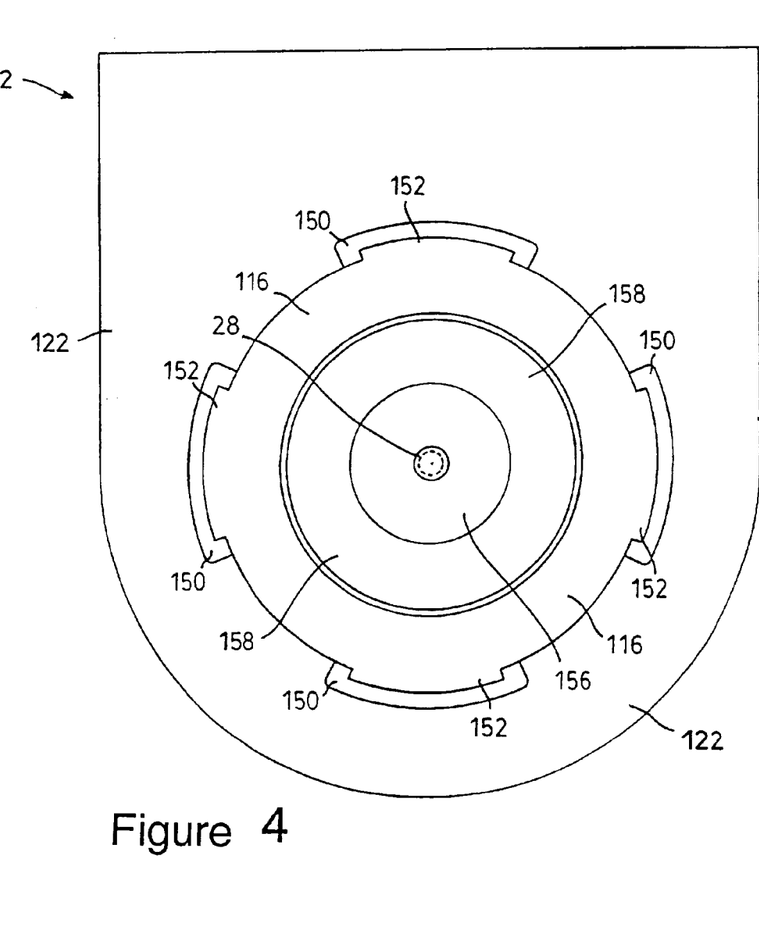
FIG. 4 shows a top view of a force transmission element of a measurement device according to the second embodiment of the present invention.
Figure 5:
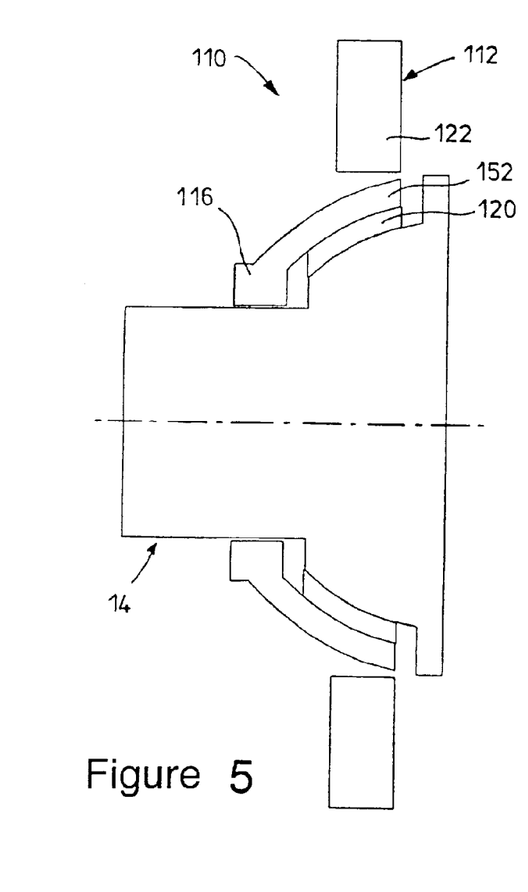
FIG. 5 shows a partial sectional view of a measurement device according to the second embodiment of the present invention.
Figure 6:
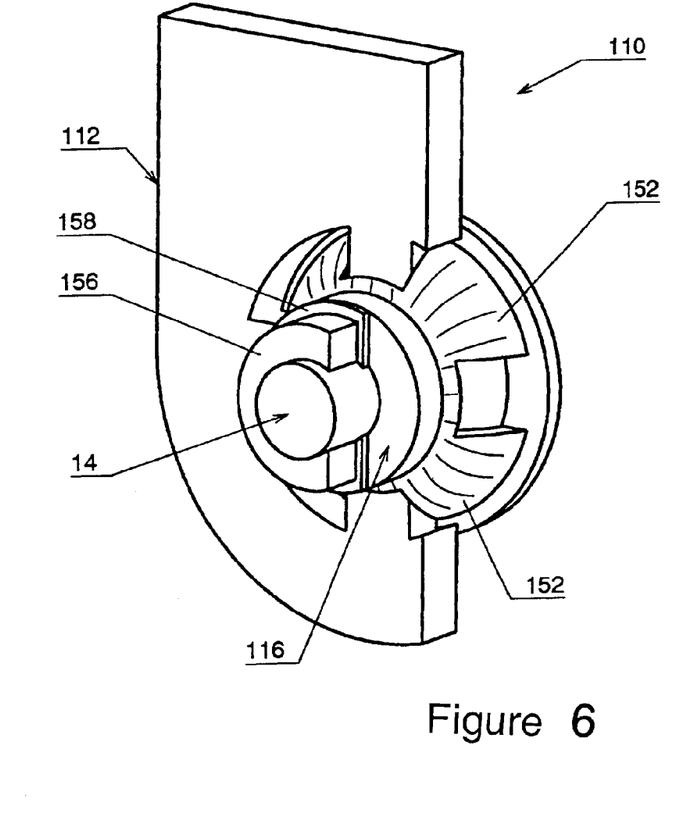
FIG. 6 shows a perspective view of a measurement device according to the second embodiment of the present invention.
Figure 7:
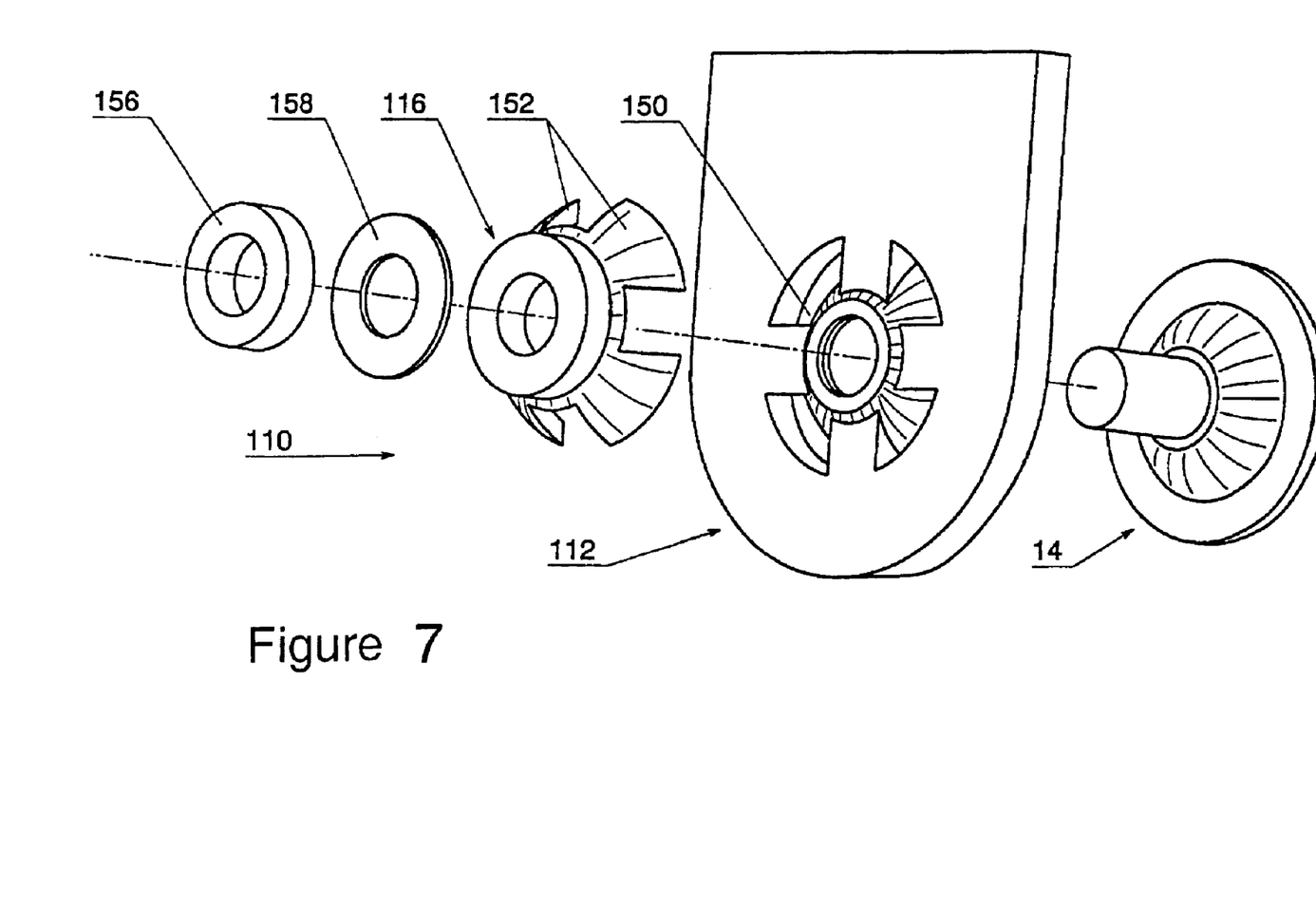
FIG. 7 shows a perspective exploded view of a measurement device according to the second embodiment of the present invention.

In the following, the individual parts of the measurement device according to the first embodiment of the present invention are described with reference to FIGS. 1 and 2.

The force transmission element 12 has a spherical zone region/spherical cup region 18, i.e., a region which essentially corresponds to a half sphere having a cut-off cap. An attachment element 22 extends in the radial direction in at least some regions from an equator region 20 of the spherical zone region 18 of the force transmission element 12. The attachment element 22 is preferably implemented in one piece with spherical zone region 18. Attachment element 22 may have the shape of a circular ring which extends around the circumference of the equator region 20 of the spherical zone region 18. Furthermore, the attachment element 22 may instead extend in the radial direction from the spherical zone region 18 in only some regions. It is even conceivable that attachment element 22 is implemented as one or more mounting ribs. The measurement device 10 may be attached to a vehicle seat, for example, by the attachment element 22.

The measurement assembly 14 also includes a spherical zone region/spherical cup region 24, whose external radius is designed in such a way that it is somewhat smaller than the internal radius of the spherical zone region 18 of the force transmission element 12, so that the force transmission element 12 may rotate around the measurement assembly 14. The measurement assembly 14 has a projection 26 on one end (left side in FIG. 1), which preferably essentially projects from the pole of the spherical zone region 24. An external thread 28 is provided on the projection 26. Using this thread 28, a positioning device 16 (described later) is fixed on the measurement assembly. A square 30 and a thread 32 are provided on the other end of the measurement assembly 14 (right side in FIG. 1). During installation of the measurement device 10 into a vehicle, for example, the square 30 is engaged with a corresponding recess in a vehicle body part 80, e.g., a seat rail on a vehicle body, and fixed and locked using an attachment nut 34, which is screwed onto the thread 32. The measurement assembly may be implemented using a molded part 44, which essentially encloses the spherical zone region 24 and the projection 26, and a sensor device 46, which is preferably implemented as one piece with the square 30 and the thread 32. The molded part 44 is preferably welded to the sensor device 46 at the position indicated with reference number 48. However, it is also conceivable to connect the molded part 44 and the sensor device 46 to one another in another suitable way or to implement them in one piece.

The region that is at least partially enclosed by the spherical zone region 18 is a region into which the measurement assembly 14 may be inserted.

The measurement assembly 14, which preferably is or includes the sensor device 46, advantageously includes one or more strain gauges. However, any other suitable type of sensor, for example piezoelements, may also be used.

The positioning device 16 is implemented in such a manner as to secure the force transmission element 12 against movement in radial directions. For this purpose, the positioning device 16 has a spherical zone region/spherical cup region 36, whose internal radius essentially corresponds to the external radius of the spherical zone region 18 of the force transmission element 12, but is designed to allow rotation and/or pivoting of the force transmission element 12 around the measurement assembly 14. Furthermore, the positioning device 16 has an internal thread 38, which fits with the external thread 28 of the measurement assembly 14, so that the positioning device 16 may be screwed onto the projection 26 of the measurement assembly 14.

The force to be measured is advantageously conducted into the measurement assembly 14 essentially or at least approximately perpendicularly to the longitudinal extension of the measurement assembly 14. Herein, the longitudinal extension of the measurement assembly 14 refers to the extension of the measurement assembly 14 in the horizontal in FIGS. 1 and 2. The force transmission element 12 is also positioned essentially perpendicular to the longitudinal extension of the measurement assembly 14 and encloses the measurement assembly 14 essentially around its circumference (FIG. 2). Therefore, in particular, both a force acting from top to bottom in FIG. 2, i.e., a pressure force, and a force acting from bottom to top in FIG. 2, i.e., a tensile force, may be transmitted by the force transmission element 12 to the measurement assembly 14.

The force transmission element 12, the measurement assembly 14, and the positioning device 16 are arranged essentially in a form-fitting way in relation to one another. Therefore, the tensile and pressure forces acting on the measurement device 10 are conducted essentially without losses into the measurement assembly 14.

The positioning device 16 and the force transmission element 12 form a fixing device and/or coupling device for the measurement assembly 14 and/or an aid for the positioning measurement assembly 14.

Friction-reducing layers 40, 42 are provided between spherical zone region 24 of the measurement assembly 14 and spherical zone region 18 of the force transmission element 12 and between semicircular region 18 and spherical zone region 36 of positioning device 16. These friction-reducing layers are preferably made of Teflon and may be implemented as molded parts or as a coating.

A measurement device 110 according to a second embodiment of the present invention is shown in FIGS. 3 to 7.

The measurement device 110 according to the second embodiment of the present invention includes elements which are similar or identical to elements of the measurement device 10 according to the first embodiment of the present invention. Such similar or identical elements are indicated with the same reference numbers as in the first embodiment, and a more detailed description thereof will be dispensed with here.

Measurement device 110 includes a force transmission element 112, a measurement assembly 14, and a union/positioning device 116.

The force transmission element 112 according to the second embodiment of the present invention includes, like the force transmission element 12 according to the first embodiment of the present invention, a spherical zone region 118, an equator region 120, and an attachment element 122. Recesses 150 are provided in the attachment element 122 according to the invention for receiving regions of the positioning device 116, which are described in greater detail hereinafter. Four recesses 150 are advantageously provided. However, it is also possible to provide another number of recesses 150. The recesses 150 are preferably configured concentrically to the spherical zone region 136. The measurement assembly 14 of the measurement device 110 is implemented similarly to the measurement assembly 14 of the measurement device 10, so that a more detailed description thereof will be dispensed with at this point. However, the projection 26 may be implemented to be longer in the second embodiment than in the first embodiment.

The positioning device/union/positioning part 116 according to the second embodiment of the present invention also has a spherical zone region 136, whose internal radius is designed to correspond essentially to the external radius of spherical zone region 118 of the force transmission element 112 and to allow rotation and/or pivoting of the force transmission element 112 around the measurement assembly 14. Furthermore, spherical zone region 136 has projecting regions/spherical zone fingers 152, which engage with recesses 150 in the assembled state of the measurement device 110. The external radius of spherical zone region 136 of the positioning device 116 is designed to be smaller than the external radius of the recesses 150. The same number of projecting regions 152 are provided as there are recesses 150. In the embodiment shown in FIGS. 3 to 7, the recesses 150 are provided as holes in the force transmission element 112, so that the projecting regions 152 can extend through the recesses 150 of the force transmission element 112. By providing the projecting regions 152, the friction reducing region between the force transmission element 112 and the positioning device 116 may be enlarged. The positioning device 116 according to the second embodiment of the present invention also has a bore 154. The bore 154 is of a size such that it may receive the projection 26 of the measurement assembly 14, but simultaneously only allows slight play between the projection 26 and the positioning device 116. The positioning device 116 is preferably rotatable around the measurement assembly 14. The positioning device 116 is secured using a nut 156, which is screwed onto the thread 28 of the measurement assembly 14. A pre-tension device 158 can be provided between the nut 156 and the positioning device 116. The pre-tension device 158 is preferably configured as a spring washer. Therefore, the pressure of the positioning device 116 on the force transmission element 112 may be suitably regulated and/or adjusted.

As in the first embodiment, friction reducing layers 40, 42, preferably made of Teflon and implemented either as a separate molded part or a coating, may be provided between spherical zone region 24 and spherical zone region 118 and between spherical zone region 118 and spherical zone region 136.

Figure 8:
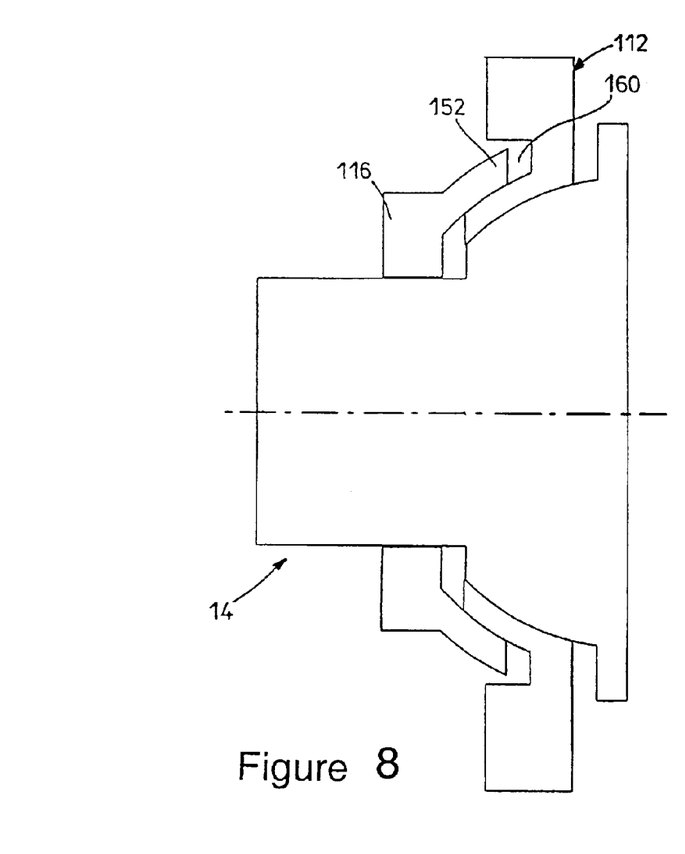
FIG. 8 shows a partial sectional view of a measurement device according to a third embodiment of the present invention.
Figure 9:
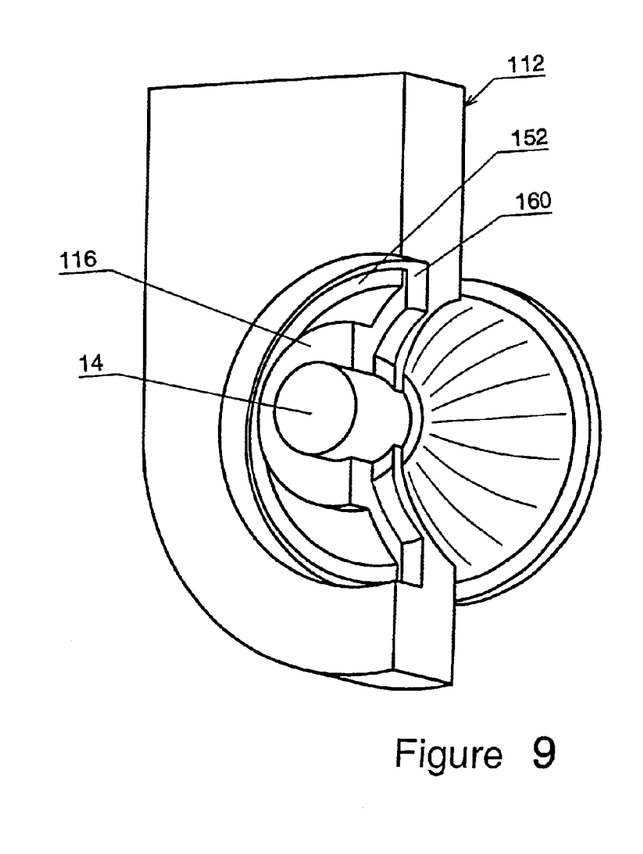
FIG. 9 shows a perspective view of a measurement device according to the third embodiment of the present invention.
Figure 10:
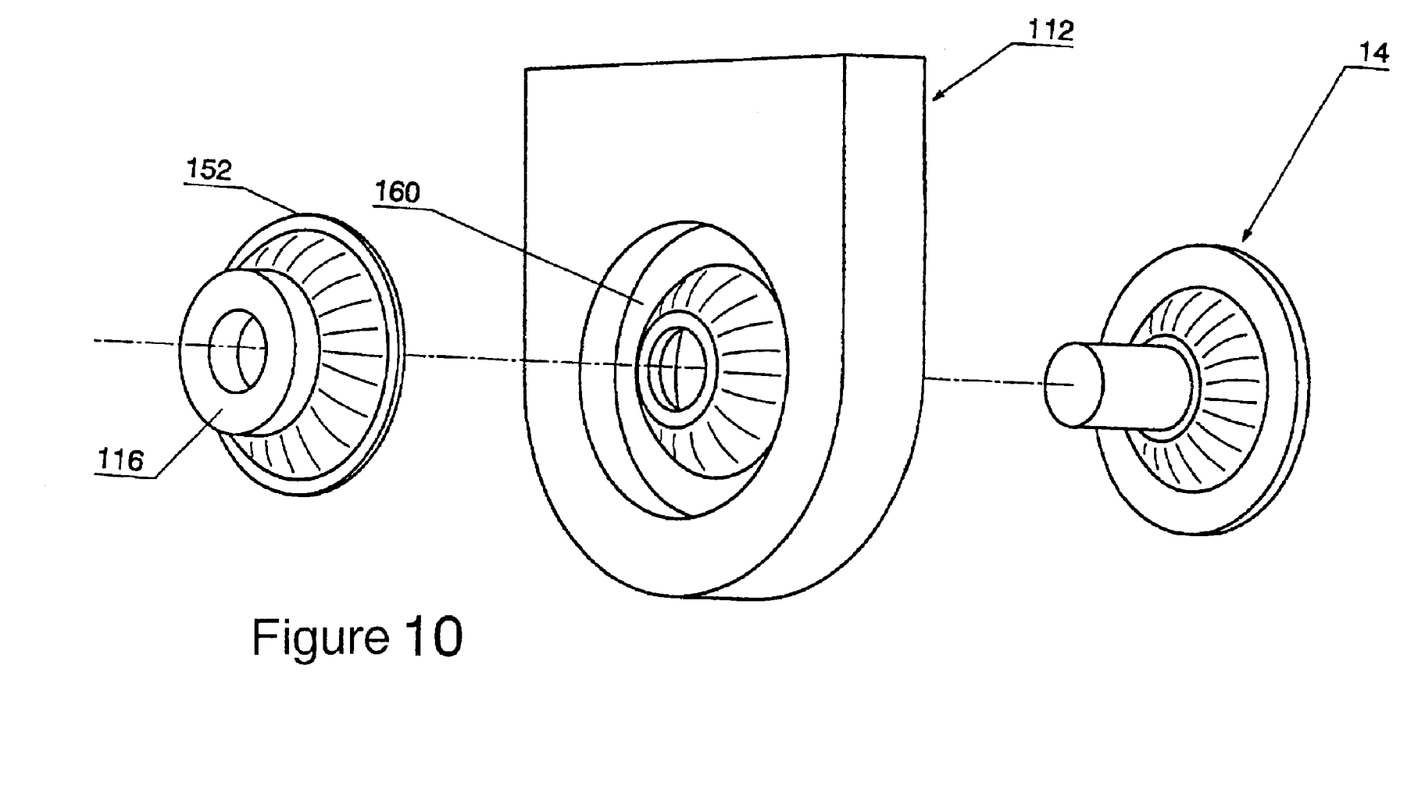
FIG. 10 shows a perspective exploded view of a measurement device according to the third embodiment of the present invention.

In the third embodiment of the present invention shown in FIGS. 8 to 10, the recesses 150 of the second embodiment are configured as depressions 160. Only one depression 160 is advantageously provided, extending in the shape of a ring which is essentially concentric to spherical zone region 136. The projecting region 152 is then also preferably implemented in a ring shape.

In a further preferred embodiment, the positioning device 16, 116 may also be designed to fix the force transmission element 12, 112 in the axial direction, i.e., in the longitudinal direction of the measurement assembly 14, 114, in order to allow at least limited rotation of the force transmission element 12, 112 around the axis of symmetry/longitudinal axis of the measurement assembly 14, 114 and to allow it to pivot out of the plane that runs perpendicular to the axis of symmetry of measurement assembly 14, 114.

The force transmission element 12, 112 is preferably implemented in the form of a plate, one end of which is connectable to the vehicle seat (not shown). The other end of the force transmission element 12, 112 is preferably configured to be semicircular in cross-section, or at least rounded, whereby the radius of the circle preferably corresponds to half the width of force transmission element 12, 112. Each spherical zone region 18, 118 is implemented in the semicircular section of the force transmission element 12, 112.

In the following, the operation of the measurement devices according to the first to third embodiments of the present invention is described in detail. Since the modes of operation of the measurement devices according to the first to third embodiments are essentially identical, the measurement device according to the first embodiment is referred to in the following, by way of example.

The completely assembled measurement device 10 is attached, by means of the attachment element 22, to a first unit, which is, for instance, a vehicle seat, and, by means of the square 30 and the thread 32, to a second unit, such as a vehicle body, so that it is secured against twisting.

Firstly, the case will be described in which a force is applied perpendicularly onto the vehicle seat and therefore perpendicularly onto measurement device 10. In this case, the entire force conducted into the measurement device 10 is conducted from the force transmission element 12 into the measurement assembly 14.

Now, the case will be described in which a force is applied diagonally onto the vehicle seat and therefore diagonally onto the measurement device 10. The force applied may be divided into one component that acts perpendicularly on the measurement device 10, i.e., in the radial direction, and one component that acts parallel to the measurement device 10, i.e., in the tangential direction. The use of a ball joint mount between the force transmission element 12 and the measurement assembly 14 ensures that only the force acting perpendicularly on the measurement device 10 is conducted from the force transmission element 12 into the measurement assembly 14. The force acting in the tangential direction is not transmitted, since the force transmission element 12 can move in the tangential direction around the measurement assembly 14. Only the actual force, i.e., the force acting perpendicularly on the vehicle seat, is conducted into the measurement assembly 14. In particular, it is thereby ensured that only the actual weight acting on the vehicle seat is conducted into measurement assembly 14. Interfering, diagonally acting forces are therefore not taken into consideration in the measurement, and a more precise measurement result is achieved. Furthermore, undesired loading of the measurement assembly 14 is prevented.

Tensile forces are also transmitted to the measurement assembly 14 in a manner analogous to that described above. In this case as well, only the perpendicular components of the force acting on the measurement device 10 are conducted into the measurement assembly 14 and therefore measured.

Figure 11:
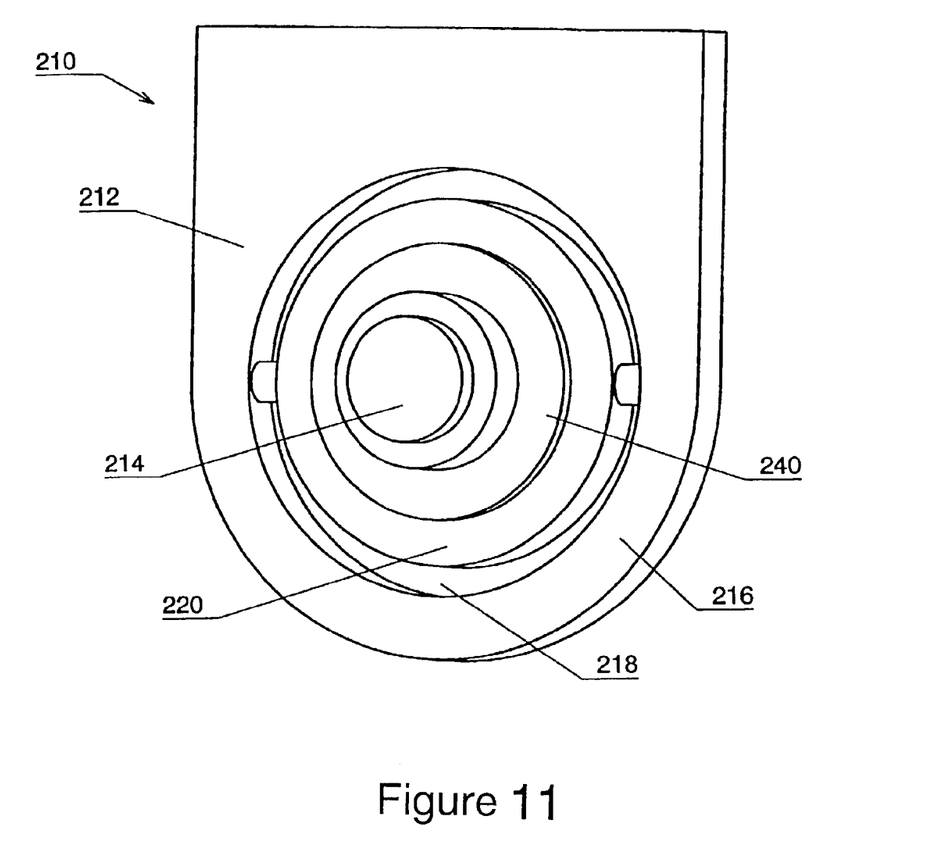
FIG. 11 shows a perspective view of a measurement device according to a fourth embodiment of the present invention.
Figure 12:
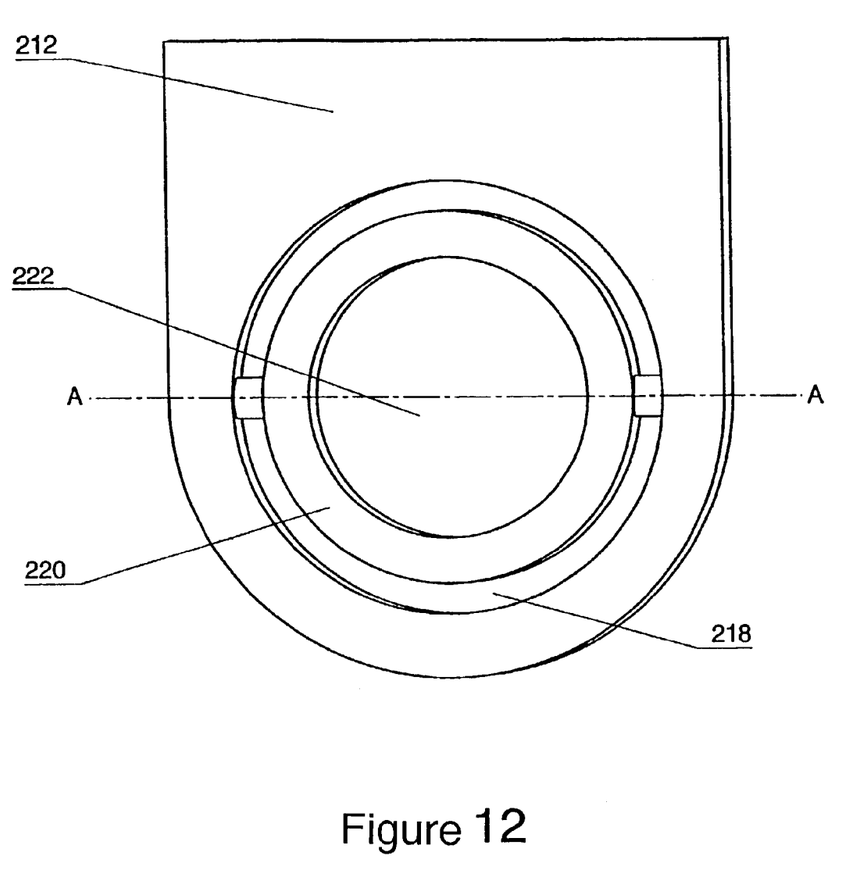
FIG. 12 shows a perspective view of a force transmission element of the measurement device from FIG. 11.

FIG. 11 shows a perspective view of a measurement device 210 and FIG. 12 shows a perspective view of a force transmission element 212 according to a fourth embodiment of the present invention.

The force transmission element 212 is implemented in the form of a plate, one end of which is connectable to the vehicle seat (not shown). The other end 216 of the force transmission element 212 is preferably rounded and/or semicircular, the radius of the circle corresponding to half the width of the force transmission element 212. A hole 218 is provided in the rounded end 216, in which a rotatably mounted rotating element/circular ring 220 is provided.

The circular ring is preferably rotatable around an axis A—A, which extends essentially perpendicular to the longitudinal extension of the force transmission element 212. A slip ring 240 is provided in an opening 222 of the circular ring 220, into which a preferably cylindrical measurement assembly 214, which includes a sensor device 246, is inserted. The slip ring 240 may be provided as a coating or as an insertable molded part. The measurement assembly 214 is rotatable around its longitudinal axis in the opening 222 of the circular ring 220 with the aid of the slip ring 240. Furthermore, it is possible for the external shape of the circular ring 220 to have a shape other than a circle and for the opening 222 to have a shape corresponding thereto.

The force to be measured is advantageously conducted into the measurement assembly 214 essentially or at least approximately perpendicularly to the longitudinal extension of the preferably cylindrical measurement assembly 214. The force transmission element 212 is, at least in the rest position, also positioned essentially perpendicular to the longitudinal extension of the measurement assembly 214 and encloses the measurement assembly 214 essentially around its circumference (FIG. 11). Therefore, both a force acting from top to bottom in FIG. 11, i.e., a pressure force, and a force acting from bottom to top in FIG. 11, i.e., a tensile force, can be transmitted by the force transmission element 212 onto the measurement assembly 214.

Therefore, the force transmission element 212 and the measurement assembly 214 are embodied essentially as a universal joint, or the measurement assembly is mounted in a way similar to a universal joint.

If a force to be measured acts diagonally on the force transmission element 212, this element is slanted in relation to the circular ring 220 and the measurement assembly 214 along the axis A—A (FIG. 12). Therefore, the components of the force to be measured which act parallel to the longitudinal extension of the measurement assembly 214 are not conducted into the measurement assembly 214 and only the force components which act perpendicular thereto are transmitted. Furthermore, using the rotatable mounting between the circular ring 220 and the measurement assembly 214, a force component which acts in the tangential direction in relation to the preferably cylindrical measurement assembly 214 may be prevented from being transmitted into the measurement assembly 214.

In this embodiment, the circular ring 220 and the force transmission element form a fixing device and/or coupling device for the measurement assembly 214 and/or an aid for positioning the measurement assembly 214.

The hole 218 and/or the opening implemented by circular ring 220 form a region into which the measurement assembly 214 may be inserted in this case.

Similarly to the first three embodiments, the measurement assembly 214 is connected to a component such as a vehicle body part.

Figure 13:
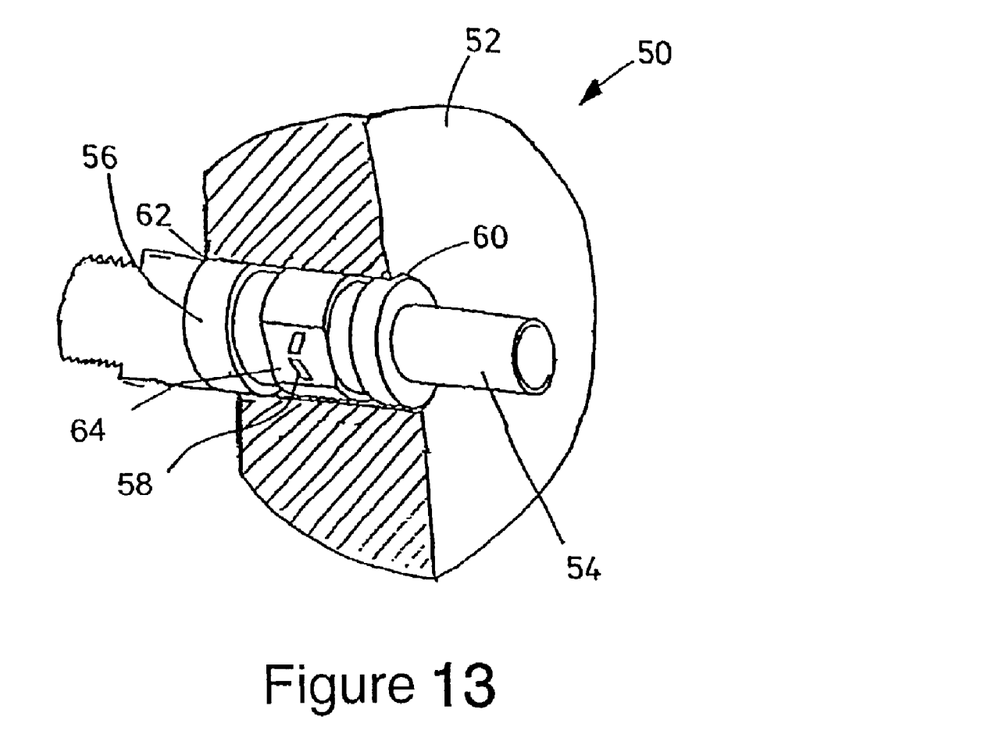
FIG. 13 shows a perspective view, partially in section, of a measurement assembly according to a preferred embodiment of the present invention.

In the following, a preferred embodiment of a measurement assembly 14 in the form of a force absorber 50, whose use has been shown to be particularly advantageous in connection with the measurement device 10, 110 according to the first to third embodiments of the present invention, is described in detail with reference to FIG. 13.

The force absorber 50 has a force conduction element 52, which is configured as a housing shaped like a spherical zone. Furthermore, the force absorber 50 has an expansion body 56 positioned centrally in the force conduction element 52, which is welded on one end 62 to the force conduction element 52. On the end opposite to end 62, the expansion body 56 is connected to a force delivery element 54, which is implemented as a screw bolt and which is, in turn, rigidly connected to the vehicle body part 80. The force delivery element 54 may, if desired, be made in one piece with the expansion body 56. The cylindrical expansion body 56 has a surface 64, which runs parallel to the direction of action of the weight, and onto which strain gauges 58 are either glued or applied using thin film technology. The strain gauges 58 are respectively positioned opposite to one another at an angle of 45° to the longitudinal axis of the expansion body 56.

A similar surface, provided with two strain gauges 58, may be attached to the side of the expansion body 56 lying opposite the first, in relation to the longitudinal axis of expansion body 56. The total of four strain gauges 58 in this embodiment can be connected into a Wheatstone bridge circuit, in order to thus elevate the quality of the measurement signal.

A thin gap 60 is provided between a thickened portion of the expansion body 56 and the force conduction element 52 on the end of the expansion body 56 lying opposite to the end 62.

Through the loading of the vehicle seat (not shown), a weight force is conducted into the force transmission element 12, which is relayed via the force transmission element 12 to the force conduction element 52. Via the rigid connection to the expansion body 56, this force is conducted at end 62 of the force conduction element 52 into the expansion body 56 in such a way that the expansion body 56 is displaced, relative to its end that is rigidly connected to the vehicle body part 80 via the force delivery element 54, in the direction of action of the weight and parallel thereto. A pronounced shear therefore arises in expansion body 56, which is detected via the strain gauges 58.

Forces acting orthogonally to the weight are not conducted into the force absorber 50 due to the ball socket mounting. In this manner, it is possible for essentially only the actual weight to be measured.

The gap 60 provides an effective overload protection for the force absorber 50. If the end 62 of the expansion body 56 is loaded in such a way that the movement of the rigid force conduction element 52 relative to loaded expansion body 56 is such that the end of the force conduction element 52 opposite to its end 62 comes into contact with the expansion body 56, further shear loading of the expansion body 56 is precluded, since the force from the force conduction element 52 is conducted directly into the force delivery element 54 via the covered end of the expansion body 56.

For the force absorber 50 to function effectively, it is unimportant whether, as described above, the force conduction element 52 forms the housing of the expansion body 56 and the force delivery element 54 forms the bolt connected to the vehicle body part 80, or whether the force is conducted via the pin and is delivered via the housing onto the vehicle body part 80.

Preferably, a region of the expansion body 56 is provided with a first recess (not shown), which leads to higher deformability of the measurement element and therefore to higher sensitivity of the strain gauges 58 positioned on the surface 64.

Furthermore, the force absorber 50 may be provided with an expansion body 56 that has a flat surface (not shown), projecting over the other contours, for attaching the strain gauges 58. Since the surface projects over the other external contours of the expansion body 56, the strain gauges 58 can thereby be attached simply onto the surface using thin film technology.

The recess is preferably implemented as an oblong hole, which results in a further increase in sensitivity. At the same time, the remaining material cross-section is reduced without too strong of an adverse effect on the stability in lateral directions.

Furthermore, a second recess (not shown) may be provided, whose axis runs essentially perpendicular to the axis of the first recess in the longitudinal direction of the expansion body 56 and which penetrates the first recess inside the expansion body 56. The positioning of the second recess allows simple laying of electric lines for connecting the strain gauges 58.

Furthermore, the gap 60 may be covered by a membrane (not shown), in order to prevent the penetration of dirt particles into the force absorber 50. Particularly effective protection of the force absorber 50 is ensured by implementing the membrane as a metal membrane. In this case, the metal membrane is welded between the force conduction element 52 and the force delivery element 54.

Instead of being a threaded bolt, the force delivery element 54 may instead have an internal thread.

Figure 14:
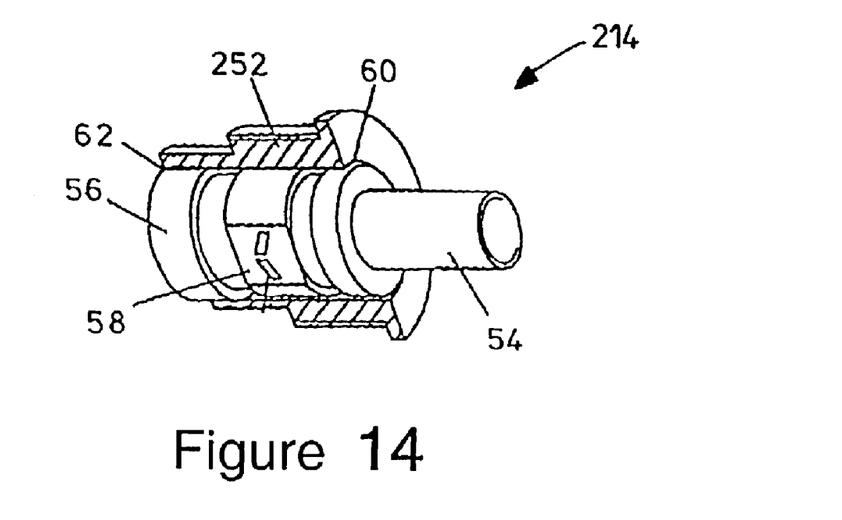
FIG. 14 shows a perspective view, partially in section, of a measurement assembly according to a further preferred embodiment of the present invention.

A particularly preferred embodiment of the measurement assembly 214, whose use has been shown to be particularly advantageous in connection with the measurement device 210 according to the fourth embodiment of the present invention, is shown in FIG. 14. The basic construction of the sensor device is essentially the same as that of the force absorber 50, so that a more detailed description will be dispensed with here. Rather, only those elements which are different from the force absorber 50 will be described.

In the measurement assembly 214 illustrated in FIG. 14, a force conduction element 252 is configured to be cylindrical in shape. The diameter of the cylinder is selected to be somewhat smaller than the diameter of the opening 222 (FIG. 12), so that the measurement assembly 214 may rotate in the opening 222. However, the diameter of the cylinder must be sufficiently large to allow force to be transmitted from the force transmission element 212 onto the measurement assembly 214.

The measurement devices 10, 110 according to the present invention are preferably used in a vehicle seat, an aircraft seat, a desk chair, or a wheelchair. Furthermore, the measurement devices 10, 110 according to the present invention can also be used in a hospital bed or any other apparatus in which the weight acting on the apparatus is to be detected.

The above description of the preferred embodiments has been given by way of example. From the disclosure given, those skilled in the art will not only understand the present invention and its attendant advantages, but will also find apparent various changes and modifications to the structures and operations disclosed. It is sought, therefore, to cover all such changes and modifications as fall within the spirit and scope of the invention, as defined by the appended claims, and equivalents thereof.

What is claimed is:

1. A measurement device comprising:
   a force transmission element, which is configured to connect to a first unit; and
   a measurement assembly, which is configured to connect to a second unit;
   wherein the force transmission element is pivotable around at least one axis around the measurement assembly and is configured to transmit tensile forces and pressure forces from the first unit onto the measurement assembly;
   wherein the force transmission element and the measurement assembly form a ball joint;
   wherein the force transmission element has the shape of a hollow spherical zone in at least some regions and has an attachment element that is positioned on an equator region of the spherical zone and that attaches the force transmission element to the first unit, and
   wherein the measurement assembly comprises a spherical zone region that mates with an interior of the spherical zone of the force transmission element.

2. The measurement device according to claim 1, wherein the measurement assembly is rigidly connected to the second unit.

3. The measurement device according to claim 1, wherein the first unit is a vehicle seat, the second unit is a vehicle body part, and the measurement device measures a weight acting on the vehicle seat.

4. The measurement device according to claim 1, wherein the attachment element extends along and around a circumference of an equator region of the spherical zone of the force transmission element.

5. The measurement device according to claim 4, wherein the attachment element extends outward in radial directions from the spherical zone of the force transmission element.

6. The measurement device according to claim 1, further comprising a positioning device that fixes the force transmission element in radial directions in relation to the measurement assembly and allows rotation of the force transmission element in tangential directions in relation to the measurement assembly; wherein the measurement assembly comprises a projection that is located on a pole area of the spherical zone region and that is configured to receive the positioning device.

7. The measurement device according to claim 6, wherein the positioning device has a substantially spherical shape in at least some regions, and corresponds at least substantially to the external shape of the ball joint.

8. The measurement device according to claim 7, wherein the positioning device has a flattened pole.

9. The measurement device according to claim 6, wherein the projection of the spherical zone region of the measurement assembly comprises a thread.

10. The measurement device according to claim 9, wherein the thread is an external thread.

11. The measurement device according to claim 9, wherein the positioning device comprises a thread which mates with the thread of the measurement assembly, and by which the positioning device is non-rotationally fixed on at least one part of the measurement assembly, and wherein a part of the positioning device exerts an elastic pre-tension on the ball joint.

12. The measurement device according to claim 11, wherein the thread is an internal thread.

13. The measurement device according to claim 1, wherein the measurement assembly comprises a polygonal region that non-rotatably connects the measurement assembly to the second unit.

14. The measurement device according to claim 13, wherein the polygonal region is rectangular.

15. The measurement device according to claim 1, wherein the measurement assembly comprises a threaded region that fixedly connects the measurement assembly to the second unit.

16. The measurement device according to claim 1, wherein the measurement assembly comprises at least one strain gauge.

17. A seating arrangement as claimed in claim 1, wherein the first unit is an aircraft seat and the second unit is a structural fixture of an aircraft.

18. A measurement device comprising:
a force transmission element, which is configured to connect to a first unit; and
a measurement assembly, which is configured to connect to a second unit;
wherein the force transmission element is pivotable around at least one axis around the measurement assembly and is configured to transmit tensile forces and pressure forces from the first unit onto the measurement assembly; and
further comprising a positioning device that fixes the force transmission element in radial directions in relation to the measurement assembly and allows rotation of the force transmission element in tangential directions in relation to the measurement assembly; and
wherein the force transmission element and the measurement assembly form a ball joint, the measurement device further comprising a fixing device rotatably fixing the positioning device on the measurement assembly, wherein the positioning device comprises a bearing region exerting a pre-tension on the ball joint.

19. The measurement device according to claim 18, wherein the fixing device is a nut.

20. The measurement device according to claim 19, further comprising a pre-tension element provided between the nut and the positioning device and exerting a force in a direction of the axis of the positioning device.

21. The measurement device according to claim 18, wherein the measurement device further comprising a spring washer that exerts the pre-tension on the ball joint.

22. The measurement device according to claim 18, wherein the attachment element comprises at least one recess, and the positioning device comprises at least one tangentially projecting region, which projects into the recess of the attachment element and allows rotation of the force transmission element in relation to the measurement assembly.

23. A measurement device comprising:
a force transmission element, which is configured to connect to a first unit; and
a measurement assembly, which is configured to connect to a second unit;
wherein the force transmission element is pivotable around at least one axis around the measurement assembly and is configured to transmit tensile forces and pressure forces from the first unit onto the measurement assembly; and
wherein the measurement device further comprises a positioning device that fixes the force transmission element in radial directions in relation to the measurement assembly and allows rotation of the force transmission element in tangential directions in relation to the measurement assembly, and a friction-reducing layer provided in at least some regions between the force transmission element and the positioning device.

24. The measurement device according to claim 23, wherein the friction-reducing layer is made of Teflon.

25. The measurement device according to claim 23, wherein the friction-reducing layer comprises at least one of a coating or a molded part.

26. A measurement device comprising:
a force transmission element, which is configured to connect to a first unit; and
a measurement assembly, which is configured to connect to a second unit;
wherein the force transmission element is pivotable around at least one axis around the measurement assembly and is configured to transmit tensile forces and pressure forces from the first unit onto the measurement assembly; and
further comprising a friction-reducing layer provided in at least some regions between the force transmission element and the measurement assembly.

27. The measurement device according to claim 26, wherein the friction-reducing layer is made of Teflon.

28. The measurement device according to claim 26, wherein the friction-reducing layer comprises at least one of a coating or a molded part.

* * * * *